Feb. 22, 1949.  E. F. BURDICK  2,462,304
SUN VISOR
Filed July 18, 1946
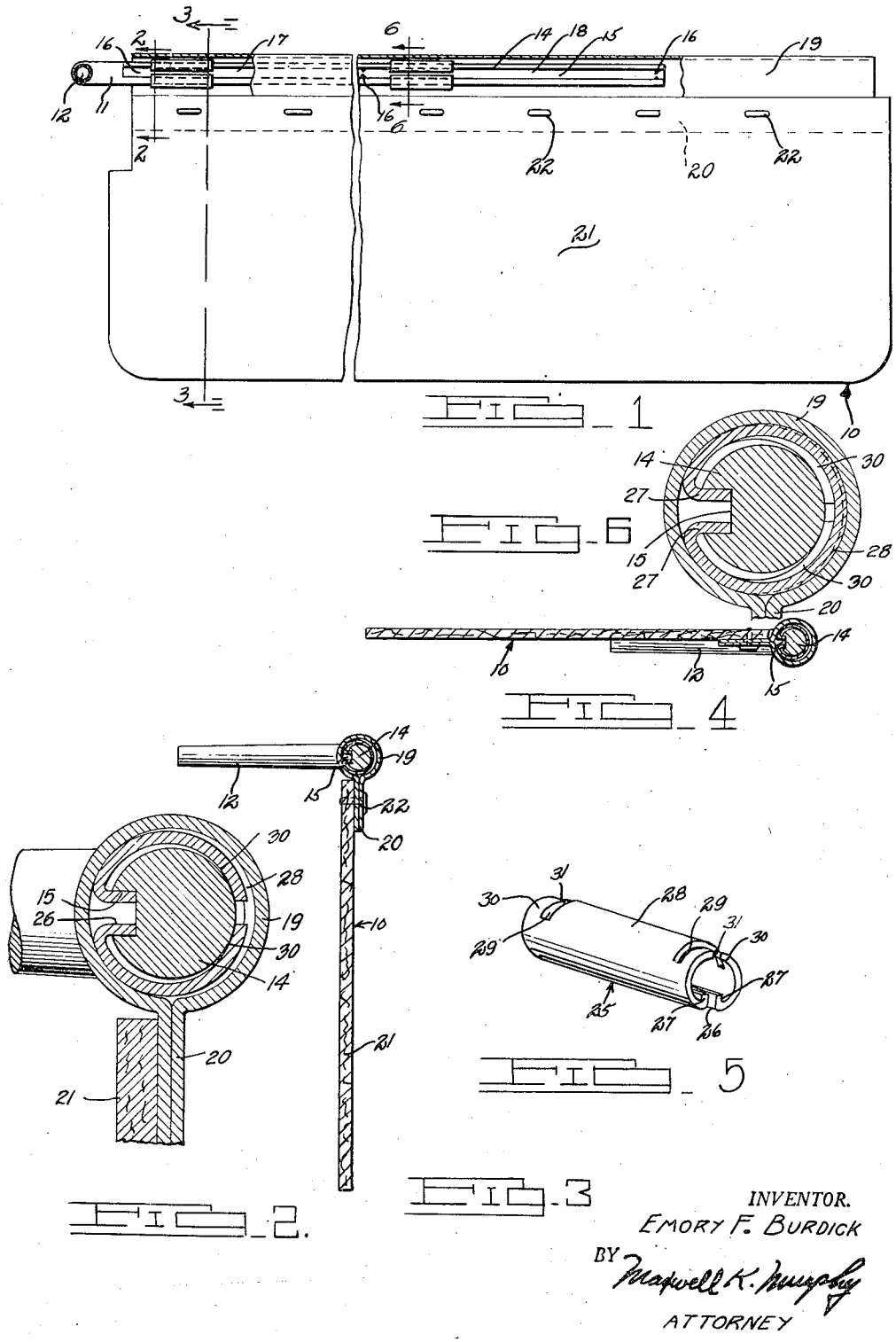
INVENTOR.
EMORY F. BURDICK
BY Maxwell K. Murphy
ATTORNEY Patented Feb. 22, 1949

2,462,304

UNITED STATES PATENT OFFICE 2,462,304

SUN VISOR

Emory F. Burdick, Detroit, Mich., assignor to F. L. Jacobs Co., Detroit, Mich., a corporation of Michigan Application July 18, 1946, Serial No. 684,513

4 Claims. (Cl. 296—97)

1

This invention generally relates to sun visors and glare shields as used on automobiles for the protection of the eyes of the occupants and particularly pertains to a new, novel and useful improvement in automobile sun visors wherein the visor is secured in an adjusted position by a spring clip that provides a frictional engagement between the visor and the clip.

The primary object of this invention is to provide a spring clip in an automobile sun visor or glare shield that is capable of retaining the visor in an adjusted position in either a using or non-using position. This is a very important feature of the invention, as the utility of a sun visor is almost completely lost if the visor will not stay positioned where the operator desires it, and, it is equally important that the visor retain a non-using position as well as a using position as this prevents the shield from falling down in front of the operators line of vision or otherwise creating distraction and annoyance.

Another object of the invention is to provide a spring clip in a visor or shield that moves longitudinally on its support rod thereby securing the visor in any desired longitudinal as well as axial position.

A further object is to provide a spring clip in a sun visor that is positioned on the support rod thereof and secured against rotation thereon which feature allows for only frictional engagement between the visor and the clip when the visor is pivoted upon its support.

Various other objects and advantages will be apparent from the following description and the attached drawings, in which:

Fig. 1 is a side elevational view of a sun visor equipped with the invention;

Fig. 2 is an enlarged cross sectional view of a portion of Fig. 1 taken on the line 2—2 thereof showing the clip in the invention installed;

Fig. 3 is a full cross sectional view of Fig. 1 taken on the line 3—3 thereof and viewing the cross section in a direction the same as Fig. 2;

Fig. 4 is a like view to Fig. 3 showing the visor in a non-using position;

Fig. 5 is a perspective view of the clip in the invention; and

Figure 6 is an enlarged cross-section taken as indicated by arrows 6—6 on Figure 1.

Describing briefly the device in the invention, the glare shield or sun visor may be of general rectangular shape and is provided with a tubular portion which is secured to and extends along the top longitudinal edge of the shield with the tubular portion freely receiving a supporting rod so that the position of the shield may be adjusted radially about the longitudinal axis of the rod and also that the position of the shield may be adjusted longitudinally along the rod. The rod is supported by any suitable means and, extends horizontally above the windshield of a motor vehicle. As the tubular member is freely receivable on the rod, a spring clip is provided to secure an adjusted relation between the rod and the tubular member by the clip positively engaging the rod and frictionally engaging the tubular member as is hereinafter more fully set forth in detail.

Referring more particularly to the device in the invention, and relative to the drawings, sun visor or glare shield 10, Figs. 1 and 3, is composed of support rod 11 which is bent at a 90° angle at a point removed from one end thereof with the shorter arm 12 of the two arms being tapered toward its end which enables it to be wedge-fitted in a supporting bracket, not shown, of conventional type so that the rod may be positioned adjacent the windshield or a side window of a vehicle. The longer arm 14 is equipped with longitudinally disposed groove 15 along a peripheral side thereof with stops or dogs 16 located in the groove 15 at the respective ends of the groove 15 and midway between the ends of the groove 15; which stops 16 divide the groove 15 into separate channels 17 and 18. Tubular member 19 is sleeve fitted over the arm 14 of the support rod 11 and is axially and laterally movable thereon with flange 20 formed integrally with the tubular member 19 and connected to visor 21 by means of rivets 22.

Clip 25, Fig. 5, is a cylindrically shaped friction clip having a longitudinal separation 26 in the wall thereof with edges 27 of the wall, as formed by the separation 26, bent inwardly toward the center of the clip 25, with elevated portion 28 disposed on the clip 25 opposite the separation 26; which elevated portion 28 is formed by semi-circular, radially disposed slots 29 spaced inwardly from the ends of the clip 25. Prongs 30 are formed by longitudinally disposed slots 31 connecting with the radially disposed slots 30 which slots 31 extend through the wall of the clip past the ends thereof.

The clip 25 is positioned on the arm 14 of the rod 11, Figs. 1 and 2, between the rod 11 and tubular member 19 externally of the rod and internally of the tubular member with the inwardly bent ends 27 extending into one of the channels 17 or 18 of the groove 15 and with the prongs 30 gripping the arm 14 opposite of the groove 15 which seats the ends 27 in the groove 15 thereby preventing relative axial rotation between the clip 25 and the rod 11 while allowing the clip 25 to travel longitudinally on the rod 11.

Also, as the tubular member 19 surrounds and confines the clip 25 against the spring tension of the clip, the clip resists this confinement, which resistance thrusts the elevated portion 28 and the body of the clip adjacent the edges 27 into a tight frictional engagement with the tubular member 19; which frictional engagement prevents relative movement between the clip 25 and the tubular member 19 under light forces such as the leverage of the visor on the tubular member 19 or the vibration of the vehicle in conjunction with this leverage.

From the foregoing description, it can now be seen that the visor will stay in an adjusted position as the groove 15 and the edges 27 prevent relative rotation between the rod 11 and the clip 25 while the tight frictional engagement between the clip 25 and the tubular member 19 insures that the tubular member 19 will retain an adjusted relation with the visor in either using or non-using condition and spaced axially and longitudinally as the operator so desires with the dogs 16 spacing the lateral movement of the clip 25 by engaging the ends 27 thereof and thereby confining a clip 25 in a channel 17 or 18.

While the invention has been shown in detail, it is to be understood that various adaptations, substitutions, omissions, and additions can be made to the invention without departing from the spirit thereof as the invention is limited only by the scope of the appended claims.

I claim:

1. In a device of the class described, a cylindrically shaped friction clip having a longitudinal separation in the wall thereof, inwardly bent edges forming the wall separation adapted to engage a slot in a rod member upon which said clip is positionable for preventing relative rotation between said clip and the rod member, an elevated portion on said clip opposite the separation in the wall thereof bounded by semi-circular, radially disposed slots spaced inwardly from the ends of said clip, and rod gripping prongs formed by longitudinally disposed slots connecting with the radially disposed slots, said elevated portion being capable of causing friction between said clip and a tubular member positionable over a rod member upon which rod member said clip is mounted.

2. In combination, a support rod having a longitudinally disposed groove along a peripheral side thereof, stops on said rod disposed in the groove in said rod formed by portions of said rod projecting into the groove, a tubular member sleeve fitted over and supported by said rod, a cylindrically shaped friction clip having a longitudinal separation in the wall thereof positioned on said rod and within said tube, inwardly bent edges forming the wall separation of said clip adapted to ride in the groove of said rod for preventing relative rotation between said support rod and said clip, said inwardly bent edges being capable of engaging said stops for laterally positioning said clip relative to said support rod, an elevated portion on said clip opposite the separation in the wall thereof for frictionally engaging said tubular member and preventing relative rotation between said clip and said tubular member bounded by semi-circular, radially disposed slots spaced inwardly from the ends of said clip and prongs on said clip, adaptable for gripping said rod, formed by longitudinally disposed slots connecting with the radially disposed slots.

3. In a device of the class described, a glare shield comprising a support rod having a longitudinally disposed groove along a peripheral side thereof, stops on said rod disposed in the groove in said rod formed by portions of said rod projecting into the area of the groove therein, a tubular member sleeve fitted over and supported by said rod, a shield carried by said tubular member, said tubular member and said shield being laterally and axially movable on and about said shaft, a cylindrically shaped friction clip having a longitudinal separation in the wall thereof positioned on said rod and within said tube, inwardly bent edges forming the wall separation of said clip adapted to ride in the groove of said rod for preventing relative rotation between said support rod and said clip, said inwardly bent edges being capable of engaging said stops for laterally positioning said clip relative to said support rod, an elevated portion on said clip opposite the separation in the wall thereof for frictionally engaging said tubular member and preventing relative rotation between said clip and said tubular member bounded by semi-circular, radially disposed slots spaced inwardly from the ends of said clip and prongs on said clip, adaptable for gripping said rod, formed by longitudinally disposed slots connecting with the radially disposed slots, said clip being capable of frictionally retaining an adjusted relation between said support rod and said tubular member carrying said shield both in axial and lateral adjustment in either using or non-using position.

4. In a device of the class described, a cylindrically shaped friction clip having a longitudinal separation in the wall thereof, inwardly bent edges forming the wall separation adapted to engage a slot in a rod member upon which said clip is positionable for preventing relative rotation between said clip and the rod member, and an elevated portion on said clip opposite the separation in the wall member for causing friction between said clip and a tubular member positionable over a rod member upon which rod member said clip is mounted.

EMORY F. BURDICK.

REFERENCES CITED

The following references are of record in the file of this patent:

UNITED STATES PATENTS

| Number | Name | Date |
| --- | --- | --- |
| 963,261 | Topping | July 5, 1910 |
| 1,032,265 | Anderson | July 9, 1912 |
| 1,625,510 | Tredwell | Apr. 19, 1927 |
| 2,260,482 | Roberts | Oct. 28, 1941 |
| 2,284,784 | Westrope | June 2, 1942 |
| 2,357,974 | Roberts | Sept. 12, 1944 |